United States Patent [19]

Ball, IV

[11] Patent Number: 5,073,266

[45] Date of Patent: Dec. 17, 1991

[54] APPARATUS FOR SEPARATING COMMINGLING HEAVIER AND LIGHTER IMMISCIBLE

[75] Inventor: Will D. Ball, IV, Tulsa, Okla.

[73] Assignee: Natco, Tulsa, Okla.

[21] Appl. No.: 605,644

[22] Filed: Oct. 30, 1990

[51] Int. Cl.⁵ .............................................. C02F 1/40
[52] U.S. Cl. .................................... 210/519; 210/521; 210/539; 210/540
[58] Field of Search ...................... 210/512.1, 519, 521, 210/539, 540, 801, 532.1

[56] References Cited

U.S. PATENT DOCUMENTS

| B 401,221 | 4/1976 | Tuttle | 210/519 |
| 1,147,881 | 7/1915 | Morris | 210/540 |
| 2,323,223 | 6/1943 | Johnson | 210/519 |
| 3,223,243 | 12/1965 | Muller | 210/519 |
| 3,275,565 | 9/1966 | Sailors | 210/540 |
| 3,951,816 | 4/1976 | Bascope et al. | 210/519 |
| 4,608,160 | 8/1986 | Zoch | 210/540 |

FOREIGN PATENT DOCUMENTS 119867  5/1958  U.S.S.R. .
124551  3/1919  United Kingdom .

Primary Examiner—Stanley S. Silverman
Assistant Examiner—Christopher Upton
Attorney, Agent, or Firm—Head & Johnson

[57] ABSTRACT

An apparatus for separating commingled heavier and lighter immiscible liquids and solids having an upright vessel, a vertical flow tube within the vessel having an upper fluid outlet opening and a lower fluid inlet opening therein, an upper horizontal spreader baffle extending from the flow tube and below the fluid outlet and a lower horizontal spreader baffle extending from the flow tube and above the fluid inlet, a concentric side tube positioned exteriorly of and parallel the vessel and connected to the flow tube below the fluid inlet and providing for the maintenance of a liquid/liquid interface within the vessel above the upper spreader baffle and a commingled fluid inlet pipe extending from exterior of the baffle to the flow tube, the baffle providing means for change of fluid direction from horizontal to vertical and vise versa to improve separation of the lighter from the heavier immiscible liquids and for drawing off both the lighter and the heavier liquids from the vessel.

6 Claims, 3 Drawing Sheets

APPARATUS FOR SEPARATING COMMINGLING HEAVIER AND LIGHTER IMMISCIBLE

SUMMARY OF THE INVENTION

Apparatuses for use in separating commingled heavier and lighter immiscible liquids have long been utilized in the industry and particularly in the petroleum industry. For background information relating generally to the art of separating immiscible liquids, reference may be had to the following U.S. Pat. Nos. 1,984,057; 2,598,746; 2,598,988; 2,701,620; 2,946,451; 3,672,511; 4,014,786; 4,299,703 and 4,603,000.

Heretofore the design of equipment for separating immiscible heavier and lighter liquids has been based primarily on trial and error experimentation, rather than on sound engineering principles. Many seemly well thought out designs have proven to be inefficient and ineffective. Performance evaluation heretofore of known liquid/liquid separators is typically accomplished only sporadically and then only after a system is completed, in service, and performing poorly.

Liquid/liquid separators such as the designs represented by the above mentioned U.S. Patents function with a limited degree of success and each has characteristics which can achieve the separation of a heavier from a lighter immiscible liquid. However, none of the devices shown in the prior art references accomplish the separation of one immiscible liquid from another at a rate of effectiveness which is desired in the industry today.

In the past, the industry has not been as critically concerned with the completeness of separation of heavier and lighter liquids, such as water from an oil emulsion. In today's environment where concern is about reducing contamination and improving the quality of the environment, it is more important than in the past that equipment be designed more effectively and efficiently to accomplish the separation of liquids, such as oil and water, so as to provide as near as possible the ability to discharge water separated from an emulsion which has a degree of freedom of entrained lighter component, such as oil, than has been acceptable in the past. The present invention is directed toward an improved highly effective apparatus for separating commingled heavier and lighter immiscible liquids, and specifically such as commingled oil and water and even more specifically, commingled oil and water having gas entrained therein. Some of the unique features of the immiscible liquid separator of the present invention include the following features:

1. A vessel tangential inlet is designed to impart centrifugal vortex shedding motion to create a spiralling rise through a mixing chamber for repeated contact and coalescing heavier liquids and solid contaminants.
2. A vertical mixing chamber within the vessel is divided into three distinct sections for: (a) inlet fluid mixing: (b) free gas evolution in an isolated area not continuous with the immiscible phase; and (c) an outlet conduit which enhances hydraulic flow characteristics.
3. Horizontal liquid flow distribution is utilized in an increasing radial path and decreasing velocity path at very close proximity to the liquid/liquid interface for bulk separation.
4. Directional flow changes are achieved at below separation velocity with distribution controlled to maximize hydraulic efficiency.
5. Vertical and downward flow is achieved to direct all settlable solids to the vessel bottom for collection and removal.
6. A second ninety-plus degree liquid flow direction change from vertical to horizontal around a second cone is achieved at below separation velocity to ensure that all settlable solids actually settle from both the heavier and lighter liquids before they are discharged.

These advantages are achieved in an apparatus for separating commingled heavier and lighter immiscible liquids having an upright vessel with a commingled fluid inlet, a heavier liquid outlet, a lighter liquid outlet and a gas outlet. A flow tube is positioned centrally within the vessel. A flow inlet pipe connects the vessel commingled fluid inlet to the flow tube in a tangential manner to cause flow of the commingled fluid in a circular pattern upwardly within the flow tube. The circular flow pattern is a key performance design consideration.

A separating-liquids outlet is provided in the flow tube adjacent the top. An upper spreader baffle is located within the vessel below the lighter liquid outlet.

By means of a concentric siphon tube a liquid/liquid interface is maintained within the upward portion of the vessel and above the upper spreader baffle. By means of the lighter liquid outlet a liquid/gas interface is maintained in the upper portion of the vessel above the liquid/liquid interface. A gas outlet is provided for removing separated gas from the interior of the vessel.

The flow tube has a heavier liquid inlet in the lower portion thereof. A lower spreader baffle is positioned within the vessel and above the heavier liquid outlet in the flow tube. The flow tube heavier liquid outlet is connected to the concentric siphon tube so that the heavier liquid is withdrawn from the vessel.

In this manner the heavier liquid flow path provided within the vessel undergoes first, a vertical upward vector, a radially horizontal vector within the upper portion of the vessel and immediately below the liquid/-liquid interface, a vertically downward vector within the vessel, a horizontal vector within the vessel below the spreader baffle and into the liquid outlet. These flow direction reversals ensure more effective and efficient fluid separation and the separation of both lighter and heavier entrained liquids and solids within the vessel.

A better and a more complete understanding of the invention will be had by reference to the following description and claims, taken in conjunction with the attached drawings.

DESCRIPTION OF THE PREFERRED EMBODIMENT

Figure 1:
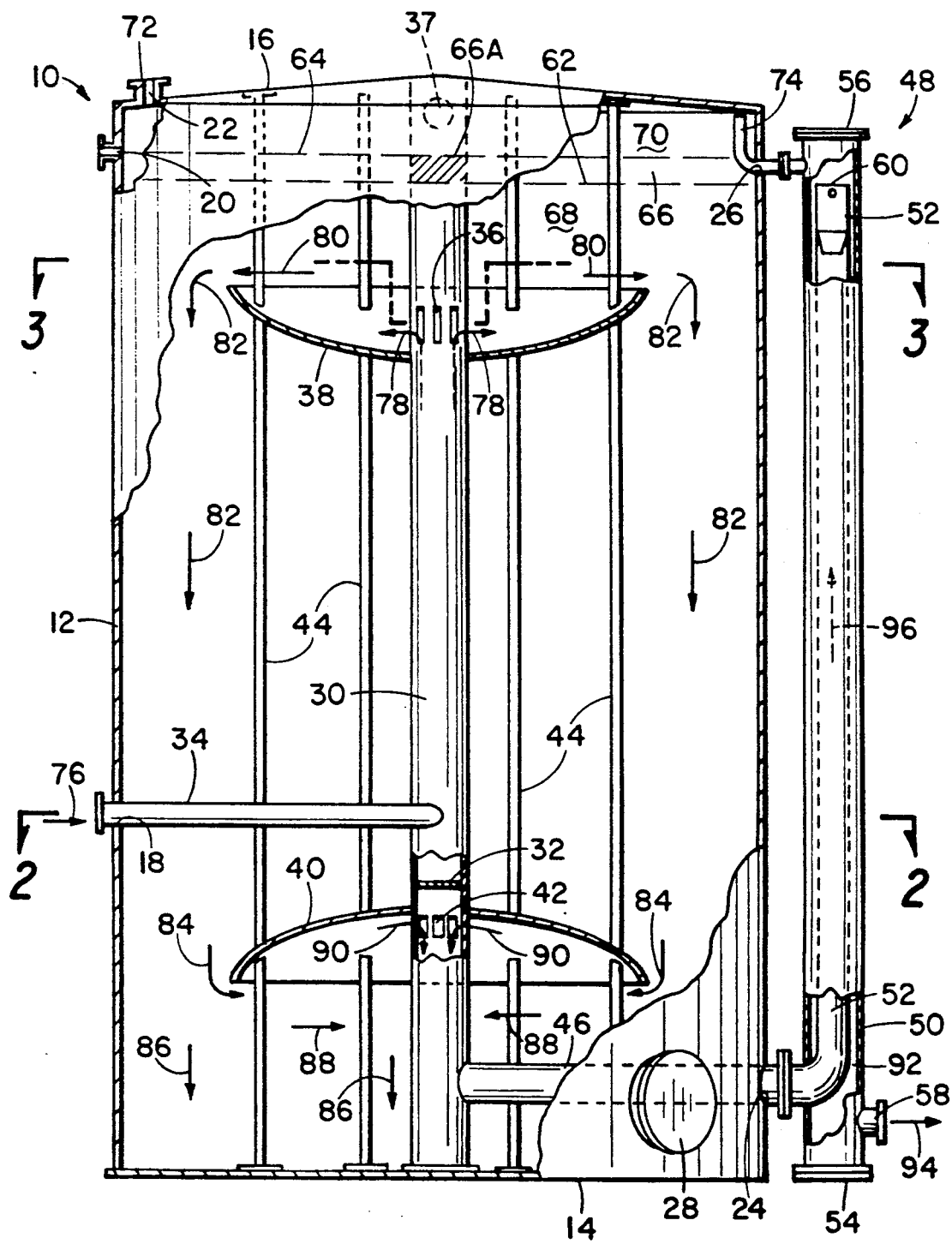
FIG. 1 is an elevational view of a vessel shown broken away to reveal the interior construction, the vessel incorporating the concepts of the present disclosure. The vessel includes an adjacent concentric siphon tube externally of the vessel, the siphon tube being also shown partially broken away to reveal interior features.

Referring to the drawings and first to FIG. 1, an apparatus for separating commingled heavier and lighter immiscible liquids is illustrated as a preferred means of practicing the invention. The apparatus includes an upright vessel generally indicated by the numeral 10. The vessel includes a cylindrical wall 12, a bottom 14 and top 16. The vessel is intended to be supported upon the earth or upon a foundation resting upon the earth, the support not being shown.

Formed in the vessel wall 12 or top 16 is a commingled fluid inlet 18, a lighter liquid outlet 20, a gas outlet 22, a heavier liquid outlet 24 and a pressure equalization opening 26. A manhole cover 28 is illustrated as a means for providing an access into the lower portion of the vessel.

Figure 2:
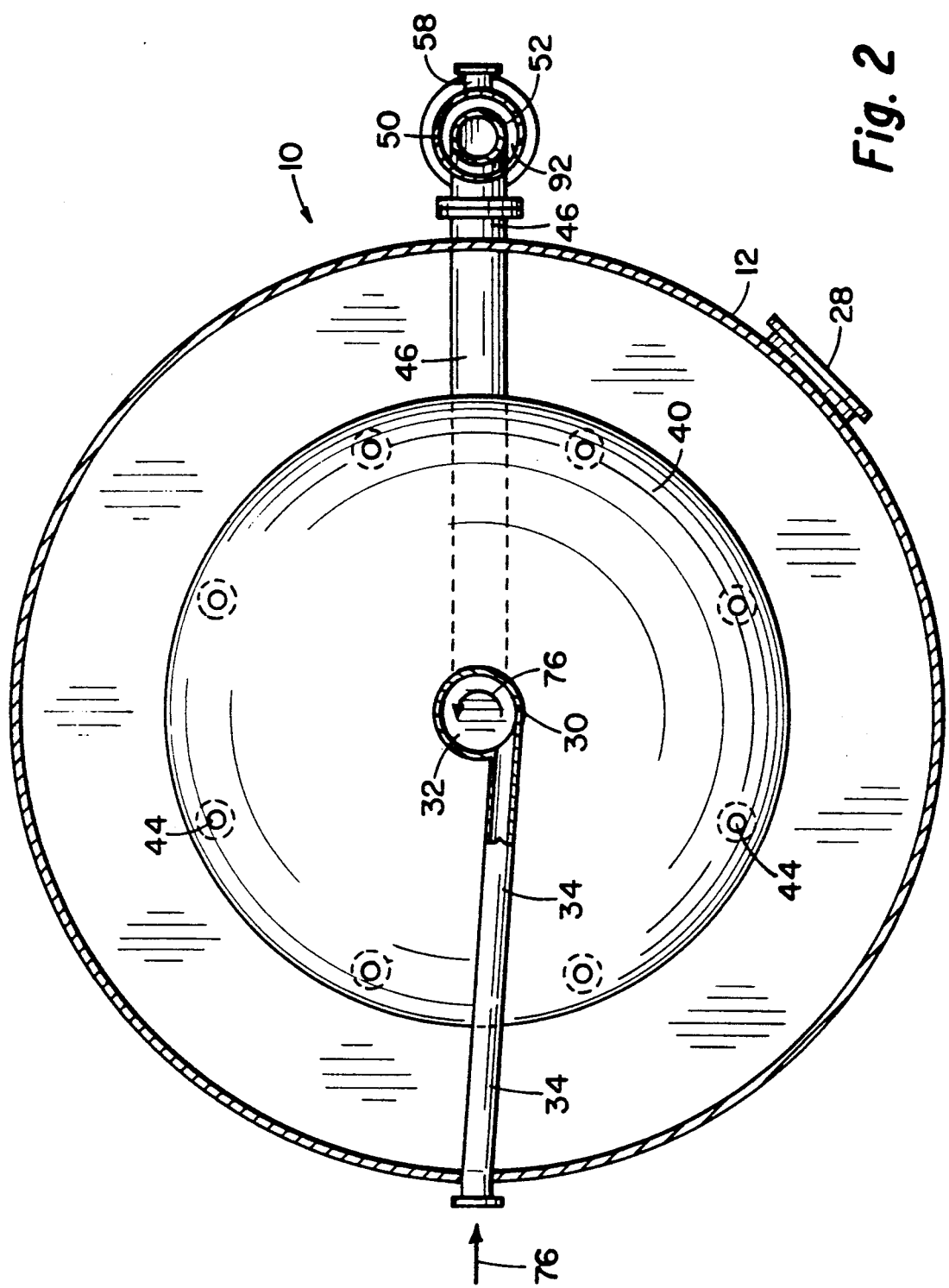
FIG. 2 is a horizontal cross-sectional view taken along the line 2—2 of FIG. 1 and showing details of the fluid inlet pipe with its tangential connection to the vertical flow tube and showing the interior cross-sectional view of the concentric siphon tube.

Positioned within the interior of the vessel and preferably concentric with cylindrical walls 12 is a vertical flow tube 30. The interior of the flow tube is divided by a partition 32. A fluid inlet pipe 34 connects the fluid inlet opening 18 with the flow tube 30 above partition 32. This connection is preferably tangential as shown in FIG. 2.

Figure 3:
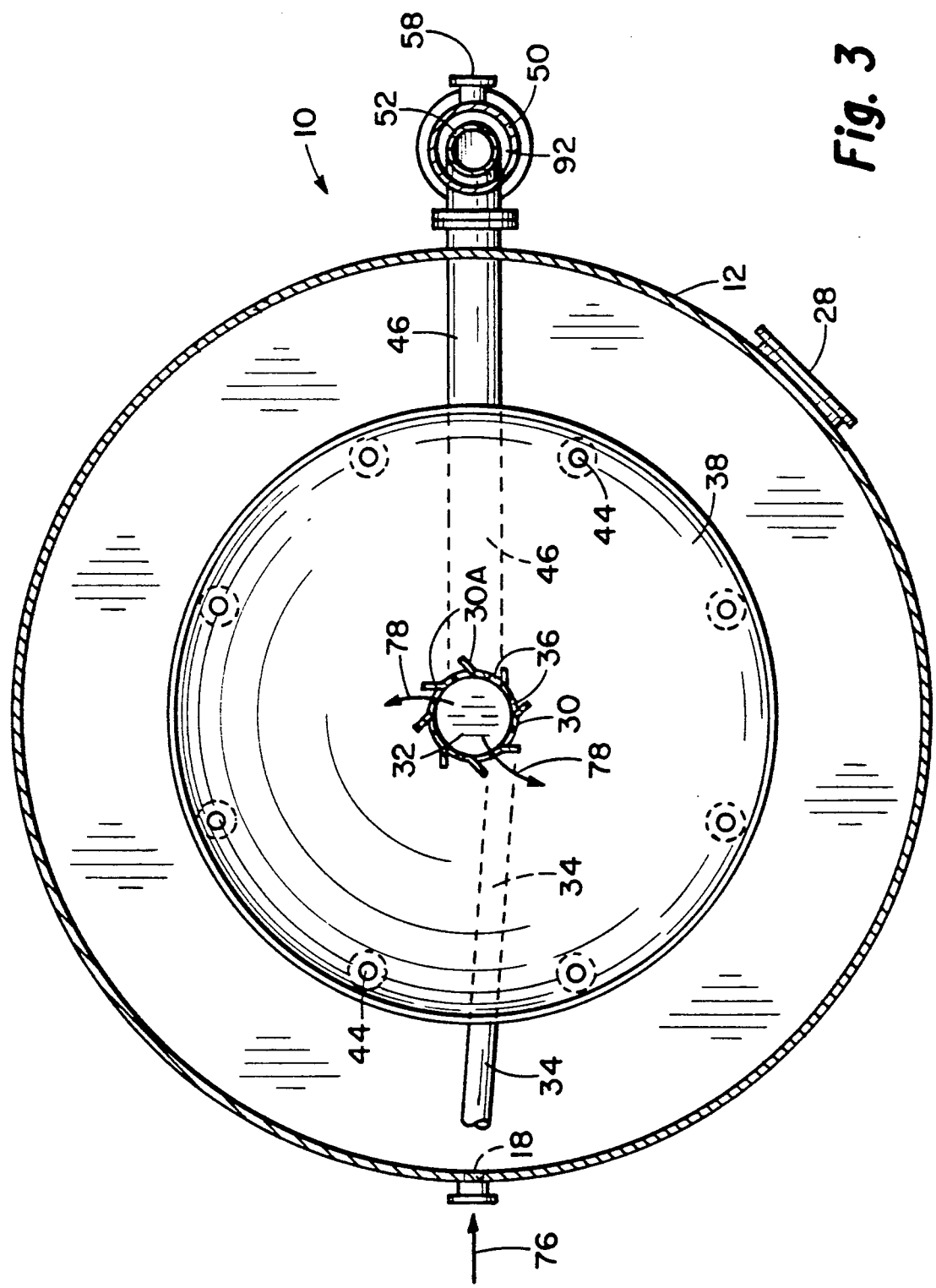
FIG. 3 is a cross-sectional view taken along the line 3—3 of FIG. 2 and showing the liquid outlet of the vertical flow tube and also showing interior details of the concentric siphon tube.

The vertical flow tube 30 has, adjacent the interior top of vessel 10, liquid outlet openings 36. These are preferably formed by vanes which can be achieved by cutouts in flow tube 30, the vanes being indicated by the numeral 30A, as shown in FIG. 3. Above these vanes, and within the gas space, are gas outlets formed in the flow tube, the gas outlets being indicated by the numeral 37 in FIG. 1.

Supported within the vessel in the upper portion thereof is an upper spreader baffle 38 which is generally horizontally extending, the baffle being immediately below the fluid outlet openings 36.

In like manner, a lower spreader baffle 40 is supported within the vessel below the fluid inlet pipe 34 and above liquid outlet opening 42 formed in the flow tube 30.

Vertical structural members 44 are positioned within the vessel to support upward and lower baffles 38 and 40, the structural members not being involved in the fluid flow patterns.

A liquid outlet pipe 46 communicates with the flow tube 30 below the liquid outlet openings 42 and extends through the heavier liquid outlet 24.

Positioned exteriorly of vessel 10 is a vertical concentric siphon tube, generally indicated by the numeral 48. The siphon tube includes an exterior tube 50, a smaller diameter concentric interior tube 52 which is connected at its lower end with liquid outlet pipe 46. The exterior tube 50 has a bottom 54 and a closed top 56. Exterior tube 50 has, adjacent the bottom, a heavier liquid outlet 58 having means for connection to piping whereby the separated heavier liquid is carried away from the apparatus.

The interior tube 52 of the concentric siphon system has a top 60 which is placed below the exterior tube top 56. The height of top 60 of interior tube 52 provides the level of a liquid/liquid interface 62 within the interior of the vessel 10. The means whereby this is accomplished will be discussed later in connection with the discussion of the flow paths of fluid within the system.

A liquid/gas interface 64 is established within vessel 10 by the location of the lighter liquid outlet 20 in the vessel. Between the liquid/liquid interface 62 and the liquid/gas interface 64 is a horizontal layer of lighter liquid 66. The lighter liquid within flow tube 30 is indicated by 66A in FIG. 1. Below the liquid/liquid interface 62 within the interior of the vessel and exterior of flow tube 30, the vessel is filled with heavier liquid 68. Above the liquid/gas interface 64 the interior of the vessel contains gas 70.

A gas outlet pipe 72 connected to the top 16 of the vessel in communication with the gas outlet opening 22 provides means for connection to piping by which gas separated from the fluids within the vessel is carried away from the apparatus.

A pressure equalization pipe 74 connects with the interior of the concentric siphon exterior tube 50 below the top 56 and above the upper end 60 of the interior tube 52 and extends through the pressure equalization opening 26. The pressure equalization tube 74 terminates within the vessel in the upper portion thereof wherein a gas 70 collects.

The apparatus of the system having been described, the flow paths will now be discussed. Commingled fluids consisting of solids and heavier and lighter liquids, with or without commingled gas, enters the vessel as indicated by the arrow 76 in FIGS. 1 and 2. The fluid entry is into the fluid inlet pipe 34. The commingled fluid flows through pipe 34 and tangentially enters the interior of flow tube 30, the flow path being in a swirling pattern indicated by arrow 76 within the interior of the flow tube above the partition 32. This tangential interconnection between the fluid inlet pipe 34 and flow tube 30 is designed to impart centrifugal vortex shedding motion to the liquid/liquid emulsion to create a spiralling flow path rise within the flow tube 30, as indicated by the arrow 76. This spiralling flow path rise within tube 30 provides an area of coalescing of the liquid/liquid emulsion within the flow tube.

The fluid and solids rise within the flow tube 30 and exits the flow tube through the fluid outlet openings 36, as indicated by arrow 78 and as seen in FIGS. 1 and 3. The fluids and solids, having exited through openings 36, indicated by arrows 78, flow generally horizontally and radially outwardly, as indicated by the arrows 80. This horizontal flow is at a decreasing rate and increasing radius and is directly below the liquid/liquid interface 62 and permits the separation of the lighter from the heavier liquid, the lighter liquid rising above the interface 62 so that the lighter liquid 66 collects above the interface 62 and heavier liquid 68 remains below the interface.

The heavier liquid, after passing upper spreader baffle 38, turns vertically downward as indicated by the arrows 82. This downward vertical migration within the interior of the vessel 10 provides ample time for any commingled lighter fluid to be separated therefrom and to rise above the liquid/liquid interface 62. Any gas separated from the commingled liquid is permitted to escape and pass upwardly through the lighter fluid 66 and 66A within flow tube 30. The separated gas collects at 70 above the liquid/gas interface 64. The collected gas is drawn from the interior of the vessel through the gas outlet 72 and carried away in piping connected to the gas outlet pipe 72.

The downward flow of heavier liquid, as indicated by the arrow 82, continues until a heavier liquid reaches the lower spreader baffle 40. At this stage in the flow path the heavier liquid undergoes a transition from downward vertical to horizontal, as indicated by arrows 84 indicating the flow direction change. This radical flow direction change causes any entrained solid particles to drop out and to be discharged downwardly vertically into the interior bottom of the vessel, as indicated by arrows 86.

The heavier liquid, after moving vertically downwardly and changing directions to flow inward horizontally, as indicated by the arrows 84, then moves in a horizontal path inwardly below baffle 40, as indicated by arrows 88. The heavier liquid flows under the lower spreader baffle 40 and enters the liquid outlet openings 42, as indicated by the arrows 90. The heavier liquid flows downwardly within the flow tube 30 below partition 32 and into the interior of liquid outlet pipe 46. The heavier liquid flows vertically upwardly within the interior tube 52 and out the upper end 60 thereof. The heavier liquid then flows downwardly in the annular area 92 and out the heavier liquid outlet 58, as indicated by arrow 94. The upward flow of heavier liquid within the inner tube 52 is indicated by arrow 96.

Thus, it can be seen that the unique flow path arrangement of the apparatus for separating lighter and heavier immiscible liquids and entrained gas is designed to provide maximum effect and efficient separation within the vessel. The flow path is such as to conduct the commingled heavier and lighter immiscible liquids horizontally at descending radial flow rates immediately below the liquid/liquid interface in the upper portion of the vessel to permit the lighter liquid to separate and enter the lighter liquid area to be withdrawn from the vessel. Gas escaping from the commingled liquids is withdrawn from the upper end of the vessel. The heavier liquid is conducted in a manner to provide flow direction changes, such as to augment the separation of any entrained heavier or lighter solids. The heavier solids being discharged downwardly into the interior of the vessel.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for separating commingled heavier and lighter immiscible fluids and solids comprising:
    an upright vessel having an outer at least substantially vertical sidewall;
    centrally within said vessel, means of directing commingled liquid flow vertically upwardly within said vessel;
    means of establishing a heavier and lighter liquid/liquid interface within the upper portion of said vessel;
    means of diverting said vertical upward flow to radial, horizontal outward flow in the direction toward said sidewall within the upper portion of said vessel and in close proximity and below said liquid/liquid interface;
    means of directing fluid flow from the horizontal to vertically downward flow in flow paths adjacent said sidewall;
    means of directing said vertical downward fluid flow to radial, horizontally inward flow in the lower portion of said vessel and into a centrally positioned fluid outlet wherein the heavier fluid component is withdrawn comprising a generally horizontal extending spreader baffle above said centrally positioned fluid outlet; and
    means of withdrawing lighter liquid from above said liquid/liquid interface.

2. Apparatus for separating commingled heavier and lighter immiscible liquids and solids according to claim 1 wherein said means of directing commingled liquid vertically upwardly within said vessel includes a centrally positioned vertical flow tube within said vessel having a lower commingled fluid inlet therein and an upper commingled fluid outlet below said liquid/liquid interface.

3. Apparatus for separating commingled heavier and lighter immiscible liquids and solids according to claim 2 including;
    a fluid inlet pipe connected with said flow tube commingled fluid inlet and extending exteriorly of said vessel, the fluid inlet pipe providing means to direct commingled fluid into said vessel.

4. Apparatus for separating commingled heavier and lighter immiscible liquids and solids according to claim 2;
    wherein said centrally positioned fluid outlet comprises a flow tube fluid inlet opening in said vertical flow tube below said commingled fluid inlet; a flow tube fluid outlet below said flow tube fluid inlet opening;
    a fluid outlet pipe connected with said flow tube fluid outlet and extending exteriorly of said vessel providing said means wherein the heavier fluid component is withdrawn; and
    a partition within said vertical flow tube between said commingled fluid inlet and flow tube fluid inlet openings.

5. Apparatus for separating commingled heavier and lighter immiscible liquids and solids according to claim 1 wherein said means of diverting upward flow to radial, horizontal outward flow within the upper portion of said vessel includes a generally horizontally extending spreader baffle below said liquid/liquid interface.

6. Apparatus for separating commingled heavier and lighter immiscible liquids and solids according to claim 1 including means of maintaining a liquid/gas interface in the top portion of said vessel and including means of withdrawing gas from the interior of said vessel above the liquid/gas interface.

* * * * *